A. O. VESTINE.
SEPARABLE FASTENER.
APPLICATION FILED MAY 15, 1919.
1,347,604.
Patented July 27, 1920.
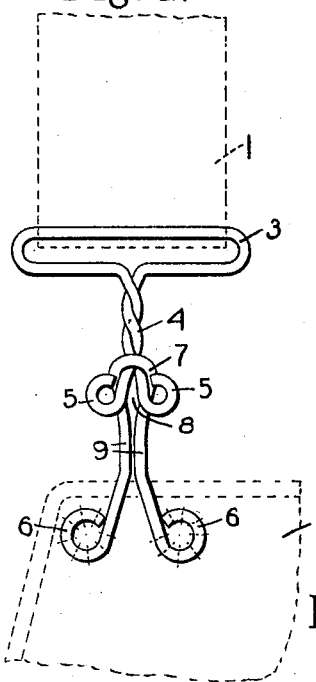
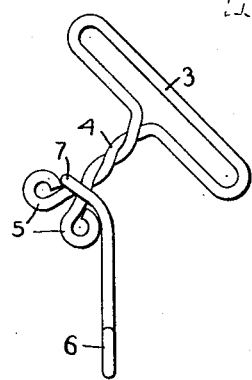
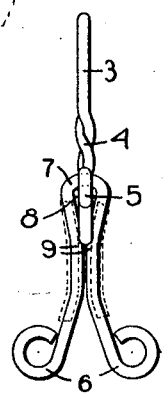
Inventor.
Andrew O. Vestine
by Heard Smith & Tennant
Attys.

UNITED STATES PATENT OFFICE.

ANDREW O. VESTINE, OF WATERTOWN, MASSACHUSETTS, ASSIGNOR TO L. C. CHASE & COMPANY, OF BOSTON, MASSACHUSETTS, A FIRM.

SEPARABLE FASTENER.

1,347,604. Specification of Letters Patent. Patented July 27, 1920.

Application filed May 15, 1919. Serial No. 297,325.

*To all whom it may concern:*

Be it known that I, ANDREW O. VESTINE, a citizen of the United States, resident of Watertown, county of Middlesex, State of Massachusetts, and whose post-office address is 200 Watertown street, Watertown, Massachusetts, have invented an Improvement in Separable Fasteners, of which the following description, in connection with the accompanying drawing, is a specification, like characters on the drawing representing like parts.

This invention relates to a two member separable fastener such as is employed for fastening together two parts of various articles such as garments. In the form illustrated it is particularly designed for fastening together the suspender and body portions of overalls but it is useful for various other purposes.

The object of the invention is to provide a fastener of this type the members of which may be readily brought together and separated and which shall allow for a certain amount of play or give or movement between the two members when connected.

A further object of the invention is to provide a fastener of this type in which the members may not be accidentally or unintentionally separated.

A further object of the invention is to provide a fastener of this type in which one and preferably both members are made of single pieces of wire.

These and other objects of the invention will appear more fully from the accompanying description and drawings and will be particularly pointed out in the claims.

In the drawings—

Figure 1 is a front view of a fastener embodying a preferred form of the invention with the members shown connected and of a type adapted to secure together the suspender and body portions of a pair of overalls partially indicated in dotted lines.

Fig. 2 is a side elevation of the construction shown in Fig. 1 with the members of the fastener in the position assumed just after the cross head of the one member has passed through the eye of the other member.

Fig. 3 is a front view of a fastener with the parts in the position shown in Fig. 2.

The fastener of this invention is composed of two separable members and each member is preferably formed from a single piece of resilient wire. The fastener may be employed for securing together various articles or parts of articles, but is particularly designed for use in connection with overalls and similar garments. In the construction illustrated in the drawings the one member of the fastener is constructed to be attached to the suspender 1, indicated in dotted lines, and the other member to the body portion 2, also indicated in dotted lines, of a pair of overalls.

One member of the fastener comprises a base 3 constructed to be attachable to one part of the article and, in the form illustrated, shown as a long narrow loop through which the suspender 1 is passed. This member also comprises a neck 4 and a cross head 5. In the particular form illustrated the neck is formed by twisting together the free ends of the wire of which the member is composed and the cross head is formed by bending the extreme ends oppositely in the same plane back upon themselves to form eyelets. These two eyelets together extend transversely of the neck 4 and form the cross head.

The second member of the fastener also comprises a base which is attachable to another part of the article such as the body portion 2 of the overalls. This base in the particular form of member illustrated is formed by bending the free ends of the wire of which the member is composed into eyelets 6 which may be attached by stitching or otherwise secured to the article. This second member also comprises a loop 7 having an eye 8 larger than the neck 4 and smaller than the cross head 5 of the first member so that when the two members are connected the neck rests loosely in the eye and the cross head extending across the eye prevents the separation of the members. The walls 9 of the loop are yieldable with respect to each other to permit the passage of the cross head of the first member through the eye, and in the form illustrated this yielding of the walls is permitted by reason of the resiliency of the wire of which the member is composed. Preferably also the eye end of the loop of the second member is bent on an obtuse angle to the body of the member as shown in Fig. 2.

When the two members are separated, in order to bring the two members together, the first member is turned in a plane at right angles to the second member and the cross head 5 slipped in through the eye 8 prying or forcing apart the walls 9 into position indicated in dotted lines in Fig. 3. Figs. 2 and 3 show the members in position assumed just after the cross head of the first member has passed through the eye of the second member. The members are then turned in respect to each other to bring them into substantially the same plane when they assume the position shown in Fig. 1. In order to separate the members the reversed operation is performed.

It will thus be seen that a two member separable fastener is presented in which the members may be readily connected and separated and in which when in position considerable play or give or movement is allowed between the members, the neck 4 sliding back and forth through the eye 8 and turning in any direction with respect thereto without disturbing the connected relation of the fasteners. It will also be seen that the members may not be separated without an intentional movement forcing the yieldable walls of the loop of the second member apart.

The second member is preferably formed of a single piece of resilient wire and preferably each member is thus formed. This presents a construction which may be readily and cheaply manufactured and one in which the desired results may be secured.

Having thus described my invention what I claim as new and desire to secure by Letters Patent is:

1. A separable fastener composed of two members, one member being made from a length of wire bent centrally to form an elongated loop, the meeting portions of the wire being twisted together and presenting a neck portion which extends at right angles from one side of the loop, and the ends of the wire being bent into oppositely-disposed eyes which form a cross-head, and the other member being formed of resilient wire which is bent centrally to form a loop portion that has two resilient sides in close proximity and an eye portion at the bend of the loop which is larger than the neck portion of the first-named member, the resiliency of the sides of the loop permitting the cross-head of the first-named member to be inserted through the eye.

2. A separable fastener composed of two members, one member being made from a length of wire bent centrally to form an elongated loop, the end portions of the wire being brought together and bent to extend at right angles from one side of the loop thereby to form a neck, and the extremities of said end portions being bent laterally in opposite directions thereby to form a cross-head, and the other member being formed of resilient wire which is bent centrally to provide a loop portion that has two resilient sides in close proximity and an eye portion at the bend of the loop which eye portion is larger than the neck of the first-named member, the resiliency of the sides of the loop permitting the cross-head of the first-named member to be inserted through the eye.

In testimony whereof, I have signed my name to this specification.

ANDREW O. VESTINE.